United States Patent [19]

Graber

[11] 4,416,379

[45] Nov. 22, 1983

[54] BICYCLE STORAGE DEVICE

[76] Inventor: Joseph V. Graber, 3739 County Trunk M, Middleton, Wis. 53562

[21] Appl. No.: 281,963

[22] Filed: Jul. 10, 1981

[51] Int. Cl.³ .............................................. A47F 7/00
[52] U.S. Cl. ........................................ 211/19; 211/94
[58] Field of Search .................... 211/19, 17, 18, 20, 211/21, 22, 94, 94.5

[56] References Cited

U.S. PATENT DOCUMENTS

| 613,773 | 11/1898 | Neumann. | |
|---|---|---|---|
| 706,718 | 8/1902 | Bradbury | 211/20 X |
| 3,682,523 | 8/1972 | Esposito | 211/23 X |
| 3,770,133 | 11/1973 | Kolker | 211/19 |

FOREIGN PATENT DOCUMENTS 1026271  2/1978  Canada .
2458502  7/1975  Fed. Rep. of Germany ........ 211/22
223686   1/1943  Switzerland .......................... 211/20

*Primary Examiner*—Ramon S. Britts
*Assistant Examiner*—Robert W. Gibson, Jr.
*Attorney, Agent, or Firm*—Vernon J. Pillote

[57] ABSTRACT

A bicycle storage device including an elongated wheel receiving channel adapted to receive the front and rear wheels of a bicycle, and a bicycle wheel engaging hook mounted on one end of the channel to extend crosswise of a medial plane bisecting the channel and at a location spaced from the open side of the channel so that the bicycle wheel can be moved laterally of the channel past the free end of the hook and then shifted in the longitudinal medial plane until both wheels rest in the channel with the weight of the bicycle supported by the hook.

13 Claims, 7 Drawing Figures

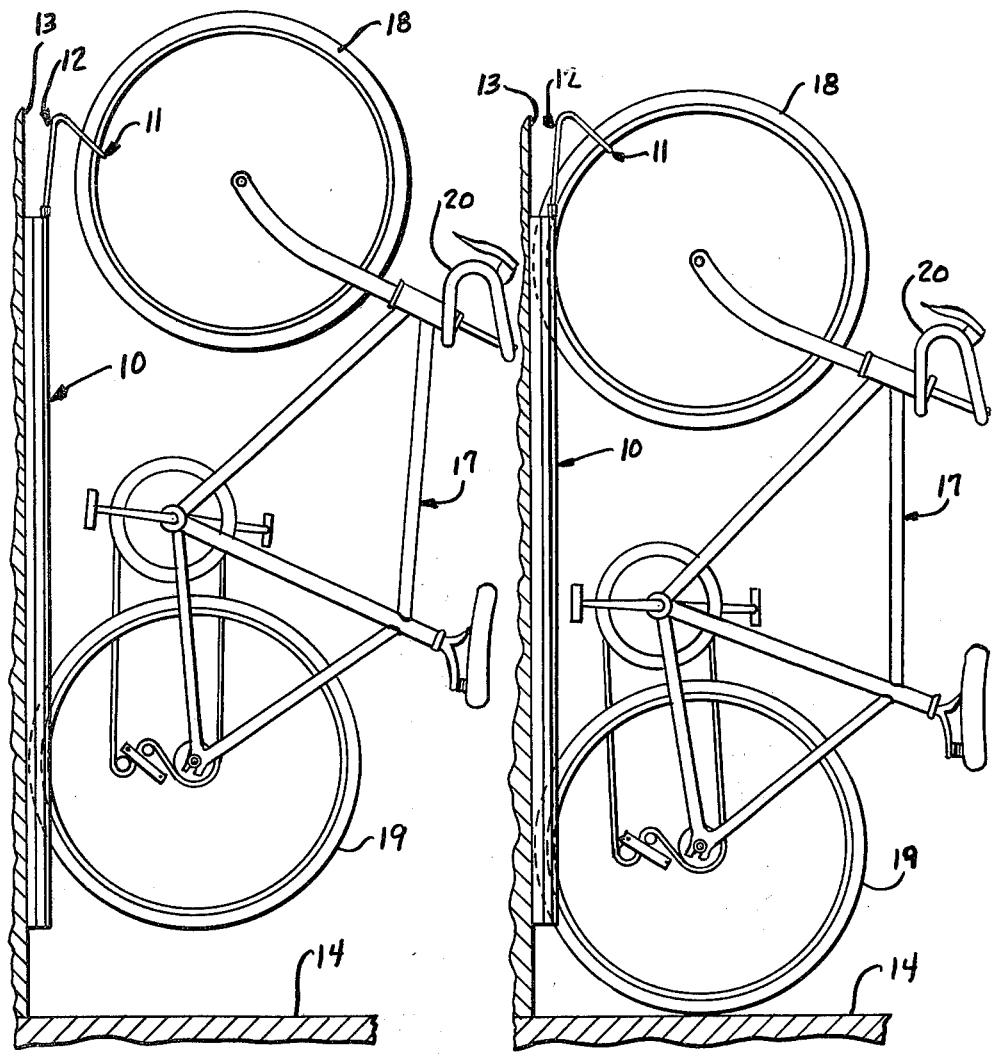
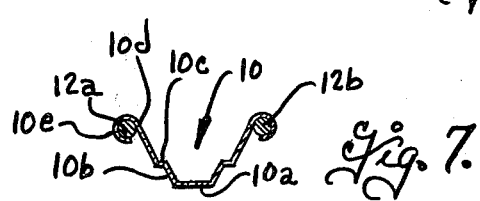

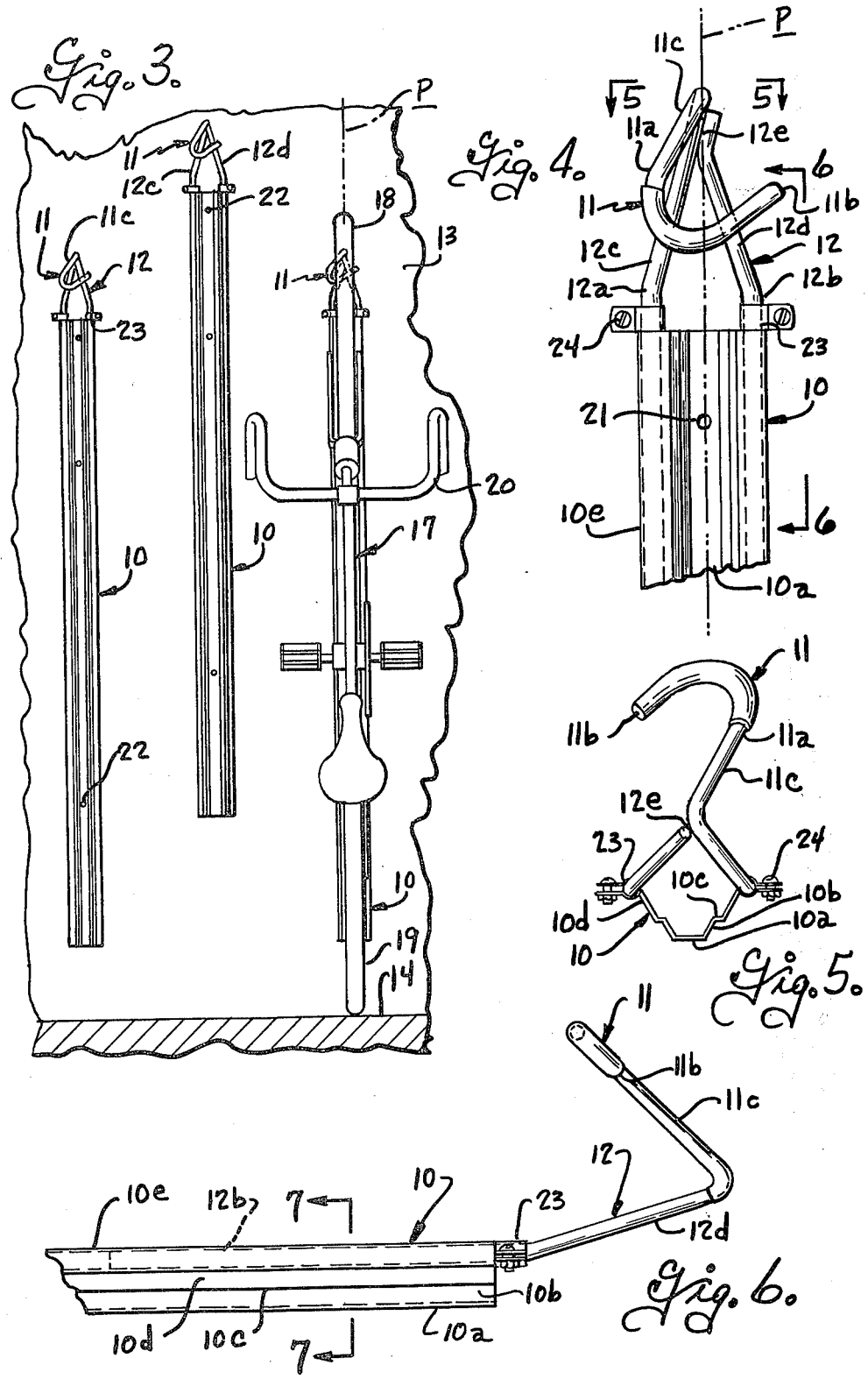

BICYCLE STORAGE DEVICE

This application is related to applicant's copending application Ser. No. 06/241,099, filed Mar. 6, 1981, now U.S. Pat. No. 4,345,705, issued Aug. 24, 1982.

BACKGROUND OF THE INVENTION

Bicycle storage devices have heretofore been made using an elongated channel for receiving the wheels of a bicycle. Some bicycle storage devices such as disclosed in U.S. Pat. Nos. 613,733 and 3,682,523, use resilient U-shaped clips for engaging opposite sides of the tire and rim of the bicycle wheel to hold the wheel in the channel. However, such resilient clips must be made so as to allow the bicycle wheel to be pressed into and removed from the clip without requiring excessive force and are not adapted to support the entire weight of the bicycle when the channel is mounted upright. Further, such resilient U-shaped clips are not adapted to receive bicycle tires and rims of widely different size. In U.S. Pat. No. 3,770,133, straps are used to attach the bicycle wheels to the wheel receiving channel and in Canadian Patent No. 1,026,271, cross pins are inserted through holes in the channel to retain the bicycle wheels in the channel. However, it is somewhat difficult for an individual to mount the bicycle in an upright channel with such devices since it is necessary to support the bicycle with one hand while attaching the strap or inserting the cross pins through holes in the channel with the other hand. Moreover, attaching the bicycle wheels to the channel with a strap or cross pins is markedly complicated when the clearance space at the side of the wheel receiving channel is obstructed, as occurs when a number of bicycles are mounted in sidewise adjacent channels.

SUMMARY OF THE INVENTION

It is the object of the present invention to overcome the disadvantages of the prior art by providing a bicycle storage device which is adapted to suspend the bicycle in an upright position and in which the user can use both of his hands to support and manipulate the bicycle during installation and removal from the bicycle storage device.

Accordingly, the present invention provides a bicycle storage device comprising an elongated wheel receiving channel adapted to receive the front and rear wheels of a bicycle with the bicycle disposed in a longitudinal medial plane bisecting the channel, a rigid wheel engaging hook, and bracket means rigidly mounting one end of the hook on the channel with the hook extending from said one end thereof crosswise of said longitudinal medial plane and terminating with its free end at the other side of the longitudinal medial plane, the hook being offset from the open side of the channel a distance such that the free end of the hook is spaced from a plane through the open side of the channel a distance greater than the radial depth of the rim and tire portion of the bicycle wheel to allow the bicycle wheel to be moved laterally of the longitudinal medial plane past the free end of the hook and then shifted in the longitudinal medial plane until it rests in the channel and engages the hook for support thereby.

The bracket means is advantageously arranged to adjustably position the hook in a direction longitudinally of the channel to allow adjustment of the vertical position of the bicycle with respect to the floor or ground.

In the preferred embodiment, the U-shaped channel is formed with a tubular rolled rim along each longitudinal edge and the hook mounting bracket includes rod portions that extend into the ends of the tubular rolled rims.

BRIEF DESCRIPTION OF THE DRAWINGS

FIG. 1 is a side elevational view of the bicycle storage device illustrating installation of the bicycle in the bicycle storage device;

FIG. 2 is a side elevational view of the bicycle storage device showing a bicycle installed therein;

FIG. 3 is a front elevational view illustrating a plurality of bicycle storage devices mounted on an upright surface and with a bicycle installed in one of the bicycle storage devices;

FIG. 4 is a fragmentary front elevational view on a larger scale than FIG. 3 and illustrating the wheel engaging hook at one end of the wheel receiving channel;

FIG. 5 is an end elevational view of the bicycle storage device taken on the plane 5—5 of FIG. 4;

FIG. 6 is a fragmentary side elevational view of the bicycle storage device taken on the plane 6—6 of FIG. 4; and FIG. 7 is a transverse sectional view through the bicycle wheel receiving channel taken on the plane 7—7 of FIG. 6.

DETAILED DESCRIPTION OF THE INVENTION

The bicycle storage device of the present invention is adapted to support a bicycle in an upright plane on a generally vertical supporting surface for storage or display of the bicycle and the bicycle storage device may, for example, be mounted on a wall, a post or column, or in a generally upright position on a rack. The bicycle support devices in general include an elongated wheel receiving channel 10, a wheel engaging hook 11 and a bracket means 12 rigidly mounting the hook on the channel. The wheel receiving channel is adapted for mounting on an upright support surface and, as shown, is mounted on a wall 13. The elongated wheel receiving channel has a length to receive the front and rear wheels 18 and 19 of a bicycle 17 when the bicycle is disposed in a longitudinal medial plane p bisecting the channel. The wheel engaging hook 11 is mounted at the upper end of the wheel receiving channel to engage one of the bicycle wheels such as the front wheel 18, and to support the bicycle with its rear wheel either lightly contacting the ground 14 or at a level above the ground. The wheel engaging hook 11 has a mounting end 11a and a free end 11b and the bracket means 12 rigidly mounts the hook on the channel with the mounting end of the hook offset to one side of the longitudinal medial plane P and with the hook extending from its mounting end crosswise of the longitudinal medial plane and terminating with its free end at the other side of the longitudinal medial plane. The hook 11 is offset from the open side of the channel a distance such that its free end 11b is spaced from a plane through the open side of the channel a distance greater than the radial depth of the rim and tire portion of the bicycle wheel to allow the bicycle wheel to be moved laterally of the longitudinal medial plane past the free end of the hook as shown in FIG. 1. The bicycle can then be shifted downwardly in the longitudinal medial plane until it rests in the channel and engages the hook for support thereby, as shown in FIG. 2.

The size of the bicycle tire varies from about 1¼" to 1⅜" for light weight bicycles to about 1¾" for mid weight bicycles and to about 2¼" for some moto cross bicycles. The wheel receiving channel 10 is advantageously of the configuration disclosed in the applicant's copending application Ser. No. 06/241,099, filed Mar. 6, 1981 for "Automobile Attached Carrier". The wheel receiving channel 10 is arranged to receive tires over the above range of tire sizes and to firmly grip the sides of the tires. For this purpose, the wheel receiving channel has a stepped cross-sectional configuration. The step in the channel stiffens and rigidifies the channel against lateral forces impressed by the bicycle tires and also improves lateral gripping of a wide range of tire sizes. As the angle between the sides of the channel is increased, the lateral gripping of the bicycle tire by the channel decreases. It has been found that a wheel receiving channel will firmly grip the sidewalls of the tire when the angle of divergence of the sidewalls is not substantially greater than 50° and preferably of the order of 45° to 50°. The wheel receiving channel 10 has an angular divergence that is less than 50° and is stepped to accommodate the above bicycle tire sizes. As best shown in FIG. 7, the channel has a generally flat base portion 10a, lower upwardly diverging side wall portions 10b, laterally outwardly extending shoulder portions 10c at the upper edges of the lower side wall portions, and upper side wall portion 10d that extend upwardly and outwardly from the shoulder portions 10c. The base portion 10a has a width narrower than the transverse width of the narrowest bicycle tire and preferably about ⅝", and the lower side wall portions 10b diverge upwardly relative to each other at an included angle of the order of 45° and are spaced apart at their upper ends a distance slightly less than the undeformed width of a light weight bicycle tire and preferably about 1⅛" to firmly grip the side walls of light weight bicycle tires when they rest in the channel. The lateral portions 10c are spaced above the base portion about ½" and provide a stepped increase in the width of the channel to about 1 7/16" which is less than the width of the undeformed mid-weight bicycle tires, and the upper side wall portions 10d diverge upwardly relative to each other at an included angle of the order of 45° to firmly grip larger moto cross tires therebetween, with the tires resting on the shoulders 10c. The upper edges of the upper side wall portions are spaced above the flange portions 10c about ¾" and their upper edges are spaced apart a distance less than the undeformed width of the moto cross tires and preferably about 2⅛". The upper edges of the panel are provided with rolled rim 10e, which rolled rims extend through an arc of substantially greater than 180° so as to form a substantially enclosed tubular rim. This arrangement is advantageous in that it rigidifies a channel and also disposes the edges at a location where they are not likely to be contacted by a user and cause injury. In accordance with the present invention, the tubular rolled rims are additionally utilized to receive the mounting bracket 12.

The hook and mounting bracket are advantageously formed of round metal rod, for example 5/16" rod and the mounting bracket 12 includes spaced parallel rod portions 12a and 12b having a length, for example 9 to 12 inches, to extend a substantial distance into the ends of a respective one of the tubular rolled rim portions 10e on the channel and allow adjustment of the bracket means in a direction longitudinally of the channel. The bracket means includes relatively converging rod portions 12c and 12d that extend from the ends of the parallel rod portions 12a and 12b respectively and which are rigidly interconnected as by welding at a location 12e spaced from the end of the channel and adjacent the longitudinal medial plane P, as best shown in FIGS. 4–6. The hook 11 has an elongated stem 11c on the mounting end 11a that is rigidly connected to the converging ends of the rod portions 12c and 12d and, conveniently, the stem 11c is formed integrally with one of the converging rod portions such as 12c. As will be seen from FIGS. 4 and 5, the stem 11c has one end adjacent the longitudinal medial plane P and the stem 11c diverges laterally from that longitudinal plane to offset the mounting end of the hook from the longitudinal medial plane. In addition, the stem 11c diverges in a direction from the converging rod portions 12c and 12d, at an acute angle to the plane through the open side of the channel. The angle of the hook relative to a plane through the open side of the channel is preferably about 45° so that the hook 11 is disposed in a plane that extends generally radially of the bicycle wheel, when the wheel is mounted in the bicycle storage device, as best shown in FIG. 2. In order to avoid scratching of the wheel rim, the hook 11 is preferably provided with a coating or tube of resilient material such as rubber, soft plastic or the like.

The base 10a of the channel is provided with fastener receiver openings at spaced locations therealong for receiving fasteners 22 for mounting the channel on an upright supporting surface such as a wall 13. The wheel base of the bicycles vary somewhat and, in addition, some bicycles have rear fenders which require supporting the bicycle at a level above the ground to prevent damage to the rear fender. The mounting brackets are advantageously adjustable in a direction lengthwise of the channel to accommodate different size and types of bicycles and, for this purpose, the parallel rod portions 12a and 12b of the mounting bracket are slidable in the rolled rims 10e of the channel and stop means 23 are mounted on the relatively parallel rod portions 12a and 12b for engagement with the end of the channel to adjustably position the hook member in a direction longitudinally of the channel. In the preferred embodiment illustrated, the stop means include clamp bands that extend around the rod portions and which have fasteners 24 for adjustably tightening the clamp bands to lock the bands in position on the respective rod portion. In this manner, the wheel engaging hook can be raised relative to the channel and the clamp bands then tightened to secure the hook in its raised position.

From the foregoing it is thought that the construction and use of the bicycle storage device will be readily understood. The wheel receiving channel 10 is mounted on an upright supporting surface at a location to receive the front and rear wheels of the bicycle and the wheel engaging hook 11 is vertically adjusted relative to its channel so that it will support the bicycles either with its rear wheel resting slightly on the floor if the bicycle does not have a rear fender, or with its rear wheel spaced above the floor if the bicycle has a rear fender. The user can then use both hands to grip the bicycle, for example by its handle bars, to lift and manipulate the bicycle to move the front wheel of the bicycle laterally of the longitudinal medial plane through the channel until the rim engages the hook as shown in FIG. 1, and then lower the bicycle in the longitudinal medial plane until both wheels rest in the channel and the front wheel engages the hook for support of the bicycle thereby as shown in FIG. 2. The hook is capable of supporting the entire weight of the bicycle when the bicycle is in an upright position and, further, since the hook is laterally offset from the open side of the channel, it engages the bicycle wheel at a location spaced above the channel to provide a laterally stable support for the bicycle. The bicycle can be removed from the bicycle storage device by simply reversing the procedure used during mounting the bicycle.

The embodiments of the invention in which an exclusive property or privilege is claimed are defined as follows:

1. A bicycle storage device comprising, an elongated wheel receiving channel having a base wall and laterally spaced relatively diverging side walls adapted to receive a wheel of a bicycle with the bicycle wheel disposed in a longitudinal medial plane bisecting the channel, a rigid wheel engaging hook, and bracket means attached to both side walls of the channel rigidly mounting one end of the hook solely on said side walls of the channel with the hook extending from said one end thereof crosswise of said longitudinal medial plane and terminating with its free end at the other side of said longitudinal medial plane, the hook being offset from the open side of the channel a distance such that the free end of the hook is spaced from a plane through the open side of the channel a distance greater than the radial depth of the rim and tire portion of a bicycle wheel to allow the bicycle wheel to be moved laterally of said longitudinal medial plane past the free end of the hook and then shifted in said longitudinal medial plane until it rests in the channel and engages the hook for support thereby.

2. A bicycle storage device according to claim 1 wherein said bracket means is slidably attached to said side walls for adjusting said hook in a direction longitudinally of side walls of said channel, and means on said bracket means engaging said side walls of the channel for retaining said bracket means in an adjusted position relative to the channel.

3. A bicycle storage device comprising, an elongated wheel receiving channel adapted to receive the front and rear wheels of a bicycle with the bicycle disposed in a longitudinal medial plane bisecting the channel, a rigid wheel engaging hook, and bracket means rigidly mounting one end of the hook on the channel with the hook extending from said one end thereof crosswise of said longitudinal medial plane and terminating with its free end at the other side of said longitudinal medial plane, the hook being offset from the open side of the channel a distance such that the free end of the hook is spaced from a plane through the open side of the channel a distance greater than the radial depth of the rim and tire portion of a bicycle wheel to allow the bicycle wheel to be moved laterally of said longitudinal medial plane past the free end of the hook and then shifted in said longitudinal medial plane until it rests in the channel and engages the hook for support thereby, said channel having a tubular rolled rim along each longitudinal edge, said bracket means including a pair of spaced parallel rod portions each extending into the end of a respective one of the tubular rolled rims.

4. A bicycle storage device according to claim 3 including means for adjusting the positions of said rod portions along said tubular rolled rims to adjust the hook in a direction longitudinally of said channel.

5. A bicycle storage device comprising, an elongaged wheel receiving channel adapted to receive the front and rear wheels of a bicycle with the bicycle disposed in a longitudinal medial plane bisecting the channel, a rigid wheel engaging hook, and bracket means rigidly mounting one end of the hook on the channel with the hook extending from said one end thereof crosswise of said longitudinal medial plane and terminating with its free end at the other side of said longitudinal medial plane, the hook being offset from the open side of the channel a distance such that the free end of the hook is spaced from a plane through the open side of the channel a distance greater than the radial depth of the rim and tire portion of a bicycle wheel to allow the bicycle wheel to be moved laterally of said longitudinal medial plane past the free end of the hook and then shifted in said longitudinal medial plane until it rests in the channel and engages the hook for support thereby, said channel having a tubular rolled rim along each longitudinal edge, said bracket means including a pair of spaced parallel rod portions each extending into the end of a respective one of the tubular rolled rims and relatively converging rod portions extending from the ends of the parallel rod portions and rigidly interconnected at a location spaced from the end of the channel and adjacent said longitudinal medial plane, and an elongated stem on said one end of said hook rigidly connected to the convergent ends of said converging rod portions and spacing said hook member laterally from the open side of the channel.

6. A bicycle storage device according to claim 5 including means mounted on the relatively parallel rod portions for adjustment therealong and engageable with the end of the channel to adjustably position the hook in a direction longitudinally of the channel.

7. A bicycle storage device comprising, an elongated wheel receiving channel adapted to receive the front and rear wheels of a bicycle with the bicycle disposed in a longitudinal medial plane bisecting the channel, a rigid wheel engaging hook, and bracket means rigidly mounting one end of the hook on the channel with the hook extending from said one end thereof crosswise of said longitudinal medial plane and terminating with its free end at the other side of said longitudinal medial plane, the hook being offset from the open side of the channel a distance such that the free end of the hook is spaced from a plane through the open side of the channel a distance greater than the radial depth of the rim and tire portion of a bicycle wheel to allow the bicycle wheel to be moved laterally of said longitudinal medial plane past the free end of the hook and then shifted in said longitudinal medial plane until it rests in the channel and engages the hook for support thereby, said channel having a stepped V-shaped cross-section and including a base wall; lower upwardly diverging side wall portions adapted to receive light weight bicycle tires; lateral flange portions extending outwardly from the upper edge of the lower side wall portions; and upwardly diverging side wall portions on the outer edges of the lateral flange portions and adapted to receive middle weight bicycle tires, the upper and lower side wall portions diverging at an included angle of less than 50°, said channel having a tubular rolled rim along each longitudinal edge, said bracket means including a pair of spaced parallel rod portions each extending into the end of a respective one of the tubular rolled rims.

8. A bicycle storage device comprising an elongated wheel receiving channel having a base wall and side walls diverging upwardly from the base wall and adapted to receive a bicycle wheel with the bicycle disposed in a longitudinal medial plane bisecting the channel, an outwardly rolled tubular rim along the upper edge of each side wall, bracket means including relatively parallel rod portions each extending into an end of a respective one of the rolled tubular rims and relatively converging rod portions extending from the ends of the parallel rod portions and rigidly interconnected at a location spaced from the end of the channel, a rigid wheel engaging hook, a stem on one end of the hook rigidly connected to the bracket means with the hook extending from the stem crosswise of said longitudinal medial plane and terminating with the free end of the hook at the other side of said longitudinal medial plane, the hook being offset from the open side of the channel a distance such that the free end of the hook is spaced from a plane through the open side of the channel a distance greater than the radial depth of the rim and tire portion of a bicycle wheel to allow the bicycle wheel to be moved laterally of said longitudinal medial plane past the free end of the hook and then shifted in said longitudinal medial plane until it rests in the channel and engages the hook for support thereby.

9. A bicycle storage device according to claim 8 wherein said converging rod portions converge toward said longitudinal medial plane.

10. A bicycle storage device according to claim 8 wherein said converging rod portions converge toward said longitudinal medial plane, said stem being rigidly connected to the convergent ends of said convergent rod portions, said stem diverging relative to said longitudinal medial plane to offset said one end of the hook from said longitudinal medial plane.

11. A bicycle storage device according to claim 10 wherein said stem diverges relative to said converging rod portions at an acute angle to a plane through the open side of the channel.

12. A bicycle storage device according to claim 10 including means mounted on the relatively parallel rod portions for adjustment therealong and engageable with the end of the channel to adjustably position the hook member in a direction longitudinally of the channel.

13. A bicycle storage device according to claim 8 wherein said side walls of said channel include lower side wall portions diverging upwardly from the base wall and adapted to receive light weight bicycle tires; lateral flange portions extending outwardly from the upper edge of the lower side wall portions; and upper side wall portions diverging upwardly from the outer edges of the lateral flange portions and adapted to receive middle weight bicycle tires, the upper and lower side wall portions diverging at an included angle of less than 50°.

* * * * *